Patented Feb. 5, 1952

2,584,852

UNITED STATES PATENT OFFICE 2,584,852

PROCESS FOR FLUIDIFYING MIXTURES MAINLY COMPRISING HIGHLY POLYMERIZED POLYVINYL ACETATES

Kurt Elias, Paris, France, assignor of one-half to A. Dawant, St. Ouen, Seine, France, a limited liability company of France No Drawing. Application March 1, 1950, Serial No. 147,129. In France March 4, 1949

2 Claims. (Cl. 260—27)

1

It is known that polyvinyl acetates have been used for a very long time as coatings and as adhesives and also for the manufacture of moulded articles.

It is also known that very highly polymerised polyvinyl acetates have very much better mechanical properties than polyvinyl acetates of low degree of polymerisation. However, the use of such highly polymerised acetates involves serious difficulties which are chiefly due to the fact they are difficult to fuse and, even at 200° C., do not produce liquids but pastes which are so stringy that they cannot be used as a coating material. For this reason, it is necessary to dissolve them in a suitable solvent. This operation, together with the complementary equipment required for recovering a portion of the solvents and the losses of solvents, considerably increase the cost of treatment.

The present invention obviates these drawbacks and relates to a process for enabling highly polymerised polyvinyl acetates to be treated without the use of solvents.

I have discovered that if a solution of colophony, or a solution of tetrachloro-naphthalene of the formula $C_{10}H_4Cl_4$, is added to a solution of polyvinyl acetate (provided of course that the solvents of these solutions are tolerated by the acetate), a perfectly homogeneous mixture is obtained without difficulty, irrespective of the proportions.

On the other hand, if fused colophony is added to a highly polymerised polyvinyl acetate (for example the one sold under the name of "Rhodopas H" by Société Rhône Poulenc) in the proportion of 100 parts by weight of acetate to 50 parts by weight of colophony, it is absolutely impossible to obtain a homogeneous mixture. The same is the case if tetrachloro-naphthalene is substituted for colophony.

But on the contrary, if 100 parts of acetate, 50 parts of molten colophony and 50 parts of molten tetrachloronaphthalene are mixed together, it is found, and this is a surprising and unforeseeable result, that a very homogeneous mixture which is of low viscosity at 150° C. can be readily obtained.

The experiments hereinafter described, wherein the proportions of the three substances involved have been varied, show that this result is not the consequence of a mere dilution of the acetate, but is due to a heretofore undiscovered physical phenomenon.

If, for example, to a mixture, heated to 150° C., comprising 100 parts of "Rhodopas H" acetate,

2

25 parts of colophony and 50 parts of tetrachloronaphthalene, a further 50 parts of tetrachloronaphthalene at 150° C. are added, a more liquefied mixture ought to be obtained owing to the fact that at that temperature tetrachloronaphthalene is very liquid. Now, just the reverse occurs and the mixture thickens, and at 200° C. it even remains pasty and stringy. But if 25 parts of colophony are added, the mixture becomes liquid again at 150° C.

This example brings out the particular importance of the part played by the proportion between the colophony and the tetrachloronaphthalene in lowering the viscosity of the mixture at a definite temperature.

In practice, and as illustrated in the following examples, the quantity of colophony should not be smaller than about 42% to 50% by weight of the quantity of tetrachloronaphthalene.

The process according to the invention may be given the most varied applications and substantially reduces the manufacturing costs.

It enables, in particular, the production to be effected of coatings on paper, cardboard, fabrics, felts of all kinds, made of animal, vegetable or synthetic fibres; it also enables adhesives to be manufactured.

Said process furthermore enables agglomerates to be obtained which can be mixed, either with fibres of any nature, or with organic or inorganic granular substances.

It is possible in all cases to operate at much lower temperatures and with less powerful mechanical means.

By way of an indication and no wise in a limitative manner, various examples for carrying out the process according to the invention are given hereinafter; the parts are indicated by weight:

Example 1

A mixture is made of:

100 parts of "Rhodopas H"
50 parts of colophony
100 parts of "Tavocire" (tetrachloronaphthalene)
50 parts of tricresylphosphate (plastifier)
40 parts of ocre

Example 2

A mixture is made of:

100 parts of "Rhodopas H"
50 parts of colophony
60 parts of anthracene oil (plastifier)
100 parts of "Tavocire"
50 parts of mineral black The mixtures obtained in these first two examples are perfectly liquid at 140–150° C.

*Example 3*

A mixture is made of:

100 parts of "Rhodopas H"
50 parts of colophony
50 parts of butyl phthalate (plastifier)
120 parts of "Tavocire"

This mixture, which is very liquid at 140° C., is particularly suitable for agglomerations.

According to the invention, instead of colophony, any other resinic acid may be used; a fatty acid may likewise be employed.

Similarly, instead of tetrachloronaphthalene, use may be made of any chlorinated naphthalene, and even of chlorinated hydrocarbons, for example chlorinated gas-oil.

It is moreover obvious that the invention has only been described herein in an explanatory and in no way limitative manner and that any useful modifications may be made therein without exceeding its scope.

I claim:

1. A coating composition which is liquid at temperatures of about 140° C. to 150° C. comprising a mixture of high viscosity polyvinyl acetate, colophony and tetrachloronaphthalene, and wherein said colophony comprises from about 42% to 50% by weight of the tetrachloronaphthalene introduced.

2. A process of producing a liquid coating composition which comprises the steps of mixing high viscosity polyvinyl acetate, colophony and tetrachloronaphthalene together, and heating the mixture to a temperature of about 140° C. to 150° C., said colophony comprising from about 42% to 50% by weight of the tetrachloronaphthalene introduced.

KURT ELIAS.

REFERENCES CITED

The following references are of record in the file of this patent:

UNITED STATES PATENTS

| Number | Name | Date |
|---|---|---|
| 2,186,446 | Brazier et al. | Jan. 9, 1940 |

FOREIGN PATENTS

| Number | Country | Date |
|---|---|---|
| 558,100 | Great Britain | Dec. 21, 1943 |
| 595,005 | Great Britain | Nov. 25, 1947 |

OTHER REFERENCES

Modern Plastics Encyclopedia, 1948, Chart No. 4 (Plasticizers Chart).